(12) United States Patent
Lee et al.

(10) Patent No.: US 7,379,844 B2
(45) Date of Patent: May 27, 2008

(54) PARTICLE SAMPLING METHOD AND SENSOR FUSION AND FILTERING METHOD

(75) Inventors: Suk-Han Lee, Yongin-si (KR); Seong-Soo Lee, Suwon-si (KR); Jang-Yong Lee, Seoul (KR); Seung-Min Baek, Suwon-si (KR)

(73) Assignee: Sungkyunkwan University Foundation for Corporate Collaboration of Sungkyundwan University, Suwon-si (KR)

( * ) Notice: Subject to any disclaimer, the term of this patent is extended or adjusted under 35 U.S.C. 154(b) by 0 days.

(21) Appl. No.: 11/276,127

(22) Filed: Feb. 15, 2006

(65) Prior Publication Data

US 2006/0190217 A1   Aug. 24, 2006

(30) Foreign Application Priority Data

Feb. 17, 2005   (KR) ............... 10-2005-0013174
Feb. 10, 2006   (KR) ............... 10-2006-0012816

(51) Int. Cl.
*G06F 15/00* (2006.01)
*G06F 7/60* (2006.01)

(52) U.S. Cl. .................................. 702/181; 703/2

(58) Field of Classification Search ................ 702/181, 702/189, 190; 703/2; 700/29, 55; 708/300
See application file for complete search history.

(56) References Cited

U.S. PATENT DOCUMENTS

| | | | |
|---|---|---|---|
| 5,465,321 A * | 11/1995 | Smyth | 706/20 |
| 5,627,768 A * | 5/1997 | Uhlmann et al. | 702/109 |
| 6,353,679 B1 * | 3/2002 | Cham et al. | 382/228 |
| 6,829,568 B2 * | 12/2004 | Julier et al. | 702/189 |
| 6,882,959 B2 * | 4/2005 | Rui et al. | 702/179 |
| 7,031,890 B2 * | 4/2006 | Lee et al. | 703/2 |
| 7,035,764 B2 * | 4/2006 | Rui et al. | 702/179 |
| 7,058,550 B2 * | 6/2006 | Kouritzin | 702/189 |

OTHER PUBLICATIONS

Wang et al., Learning Object Intrinsic Structure for Robust Visual Tracking, 2003 IEEE Computer Society Conference on Computer Vision and Pattern Recognition.*
Arulampalam et al., A Tutorial on Particle Filters for Online Nonlinear/Non-Gaussian Bayesian Tracking, Feb. 2002, IEEE Transactions on Signal Processing, vol. 50, No. 2, pp. 174-188.*

(Continued)

*Primary Examiner*—John E Barlow, Jr.
*Assistant Examiner*—Toan M Le
(74) *Attorney, Agent, or Firm*—Sughrue Mion, PLLC

(57) ABSTRACT

Disclosed is a technique for obtaining an estimate and variance of each variable based on a constraint manifold. Particles (or samples) are sampled in order to filter and fuse ambiguous data or information on at least one state variable of a system using the particles. The sampling is carried out in consideration of an influence which non-linearity of the constraint manifold of a system model, an observation model or another system model exerts on a probability distribution of the state variable. With this construction, it is possible to reduce decrease of fusion and filtering performance, decrease a Gaussian approximation error, and detect mismatched information.

7 Claims, 15 Drawing Sheets

OTHER PUBLICATIONS

Storvik, G., Particle Filters for State-Space Models with the Presence of Unknown Static Parameters, Feb. 2002, IEEE Transactions on Signal Processing, vol. 50, No. 2, pp. 281-289.*

Uosaki et al., Evolution Stategies based Particle Filters for State and Parameter Estimation of Nonlinear Models, 2004 IEEE, pp. 884-890.*

Ibanez-Guzman et al., Roadmap Constrained Slam in Neighborhood Environment, Dec. 6-9, 2004, 9th International Conference on Control, Automation, Robotics and Vision, pp. 449-454.*

Djuric et al., Signal Processing by Particle Filtering for Binary Sensor Networks, 2004 IEEE 11th Digital Signal Processing Workshop & IEEE Signal Processing Education Workshop, pp. 263-267.*

Kadirkamanatan et al., Particle Filters for recursive Model Selection in Linear and Nonlinear System Identification, Dec. 2000, Proceedings of the 39th IEEEConference on Decision and Control, pp. 2391-2396.*

Huang et al., Slam with MTT: Theory and Initial Results, Dec. 1-3, 2004, Proceedings of the 2004 IEEE Conference on Robotics, Automation and Mechatronics, pp. 834-839.*

* cited by examiner

PARTICLE SAMPLING METHOD AND SENSOR FUSION AND FILTERING METHOD

BACKGROUND OF THE INVENTION

1. Field of the Invention

The present invention relates to a particle sampling method and a sensor fusion and filtering method, and more particularly, to a technique for obtaining an estimate and variance of each variable based on a constraint manifold.

2. Description of the Conventional Art

In general, sensor fusion refers to integrated processing for combining or fusing different types of sensor information into one representative information data.

FIG. 15 illustrates a pattern of general sensor fusion.

In FIG. 15, outputs $X_1$ and $X_2$ obtained from a first two sensors are fused into a new upper representative value $X_{1,2}$. An output $X_3$ obtained from a third sensor is fused with the fused node $X_{1,2}$, thereby generating a new representative value $X_{1,2,3}$ to be fused with an upper node.

As illustrated in FIG. 1, this sensor fusion and filtering method performs fusion and filtering 103 through two stages: prediction 101 using an equation for a system model and observation 102 using an equation for observation. Conventional filters using the sensor fusion and filtering method include a Kalman filter, an extended Kalman filter, an unscented Kalman filter, a particle filter, and so on.

Among these filters, the Kalman filter for basic sensor fusion and filtering is a linear filter suitable for a Gaussian error model, but it has a problem when it comes to non-linear system processing. For the purpose of non-linear system processing, an extended Kalman filter has been developed. However, the extended Kalman filter has a drawback that an error is caused by linearization, and thus its performance can vary according to non-linearity. As an alternative to the extended Kalman filter, an unscented Kalman filter, which treats non-linear and Gaussian error model systems, has been developed. The unscented Kalman filter has been actively studied up to present, but it has a problem in that its performance can be lowered due to inaccurate Gaussian approximation.

In order to cope with the problems of these Kalman filters, a particle filter has been developed. The particle filter has the advantage of employing a method of indicating results fused by particles having various weights, and thus it can be applied to fusion and filtering of a system having non-linear and arbitrary error modes as well as ambiguous information. However, the particle filter creates a problem in real-time processing due to failure and long processing time resulting from inaccurate prediction of particles.

The following references are related to sensor fusion and filtering:

[1] M. S. Grewal and A. P. Andrews, "Kalman Filtering," 2nd ed. New York: Wiley, 2001.

[2] H. W. Sorenson, "Recursive Estimation for Nonlinear Dynamic Systems," New York: Marcel Dekker, 1988.

[3] A. H. Jazwinski "Stochastic Processes and Filtering Theory," New York: Academic, 1970.

[4] T. Ghirmai N. F. Bugallo, J. Miguez and P. P. Djuri, "A Novel Particle Filtering Approach to Blind Symbol Detection and Timing Estimation," IEEE 58th Vehicular Technology Conference (VTC2003), vol. 2, pp. 1147-1151, October 2003.

[5] D. Crisan and A. Doucet, "A Survey of Convergence Results on Particle Filtering Methods for Practitioners," IEEE Transactions on Signal Processing, vol. 50, pp. 736-746, March 2002.

[6] J. H. Kotecha and P. M. Djurić, "Sequential Monte Carlo Sampling Detector for Rayleigh Fast-fading Channels," in Proc. Int. Conf. Acoust., Speech, Signal Process., 2000.

[7] A. Doucet, S. Godsill, and C. Andrieu, "On Sequential Monte Carlo Sampling Methods for Bayesian Filtering," Statist. Comput., vol. 10, no. 3, pp. 197-208, 2000.

SUMMARY OF THE INVENTION

The present inventors have developed an integrated sensor fusion and filtering method by finding a joint probability on a constraint manifold defined in a unified fusion and filtering space unlike, thereby simplifying a conventional sensor fusion and filtering method of performing two steps of prediction using a model equation and observation using an observation equation. Thereby, application of various constraints is possible, and the geometrically expressed constraint is directly treated, so that it can be applied to various models. In addition, it can be applied to fusion and filtering of a system having a non-linear, non-Gaussian error model, as well as ambiguous information.

Accordingly, the present invention has been made to solve the above-mentioned problems, and an objective of the present invention is to provide a sensor fusion and filtering method and system based on a constraint manifold, in which a technique of finding the joint probability on the constraint manifold defined in the unified fusion and filtering space is applied, thereby enabling application of various constraints, and directly treating the geometrically expressed constraint to permit application to various models.

It is another objective of the present invention to provide a sensor fusion and filtering method and system based on a constraint manifold, in which system and observation models are expressed in the fusion and filtering space without linearization using the constraint manifold as they are, thereby being capable of reducing decrease of fusion and filtering performance caused by wrong linearization.

It is still another objective of the present invention to provide a sensor fusion and filtering method and system based on a constraint manifold, in which an error model is expressed and calculated by a sum of Gaussian thereby being capable of decreasing a Gaussian approximation error, detecting mismatched information, and being applied to the fusion and filtering problem of a system having ambiguous information.

In order to accomplish these objectives, according to an aspect of the present invention, there is provided a particle sampling method for sampling particles in order to filter and fuse ambiguous data or information on at least one state variable of a system using the particles, characterized in that the sampling is carried out in consideration of an influence which non-linearity of the constraint manifold of a system model, an observation model or another system model exerts on a probability distribution of the state variable.

Further, the particle sampling method may be characterized by the steps of: uniformly sampling the particles on an axis of a previous state variable in order to find, from the previous state variable, a probability distribution of a current state variable estimated by an equation for the system model or other system model; finding estimated weights of particles of the current state variable according to the equation of the system model or other system model and of each particle of the current state variable, from a weight allocated by the sampled particles of the previous state variable and information on a prior probability of the previous state variable; finding a prior probability distribution of a current state estimated from the estimated weight of the sampled particles of the current state variable and from the estimated weight of each particle of the current state variable; and obtaining particles of an observation variable estimated by an equation for the observation model from the current state variable in order to obtain the particles of the observation variable.

Furthermore, the particle sampling method may be characterized by the steps of: when the sampling performed on a manifold in a geometrical space of an arbitrary model equation at regular intervals is defined as "Uniform Sampling on Constraint Manifold," previously performing the sampling in the geometrical space from numerous samples meeting an equation for the system model or other system model at regular intervals, and obtaining particles of a previous state variable and a current state variable; when an interval divided uniformly on an axis of the previous state variable is defined as a bucket, finding a weight of each particle of the current state variable estimated through a weight allocated by the particles of the previous state variable and prior probability information of the previous state variable and through a number of the particles existing in the bucket; finding a prior probability distribution of a current state estimated from the estimated weight of the sampled particles of the current state variable and from the estimated weight of each particle of the current state variable; and previously performing the sampling in the geometrical space from the numerous samples meeting an equation for the observation model at regular intervals, and obtaining the particles of the previous state variable and particles of an observation variable.

In addition, the particle sampling method may be characterized by the step of obtaining samples which meet the non-linearity of the constraint manifold of the system model, the observation model or another system model as well as the constraint manifold by a Monte Carlo method.

Further, the particle sampling method may be characterized in that, when the number of the samples existing in each bucket is denoted by m, the weight of the particles of the current state variable is found by:

Weight of particles of the current state variable=Weight of samples existing in each bucket/m.

According to another aspect of the present invention, there is provided a sensor fusion and filtering method for fusing and filtering ambiguous data or information on at least one state variable of a system using particles, which is characterized by the steps of: setting a data or information fusing and filtering space composed of state and observation variables; defining a constraint manifold having various constraints in the fusing and filtering space; calculating a joint probability distribution on the constraint manifold using a prior probability distribution of the variables; calculating a marginal probability distribution of the variables from the joint probability distribution; and obtaining estimate and variance of each of the variables.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF PREFERRED EMBODIMENTS

Figure 1:
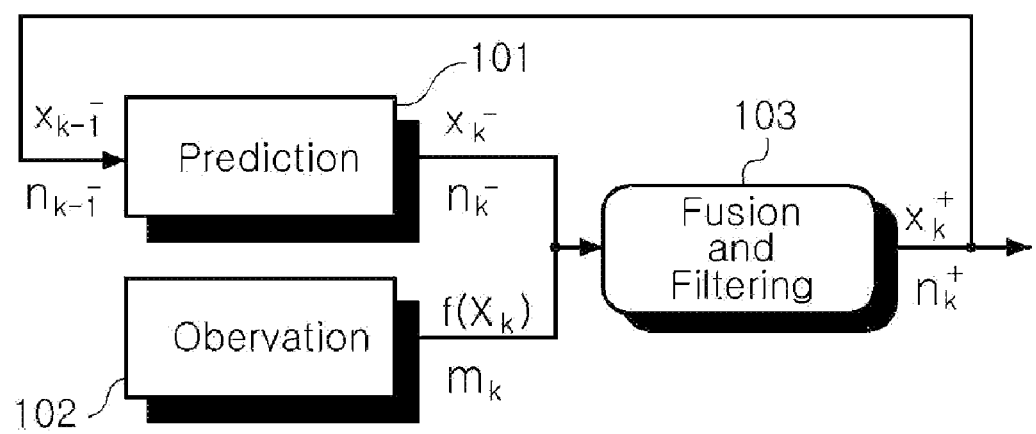
FIG. 1 is a block diagram illustrating a sensor fusion and filtering process.

Hereinafter, exemplary embodiments of the present invention will be described with reference to the accompanying drawings. In the following description and drawings, the same reference numerals are used to designate the same or similar components, and such components will be no longer described.

First, a concept of the present invention will be described.

Figure 2:
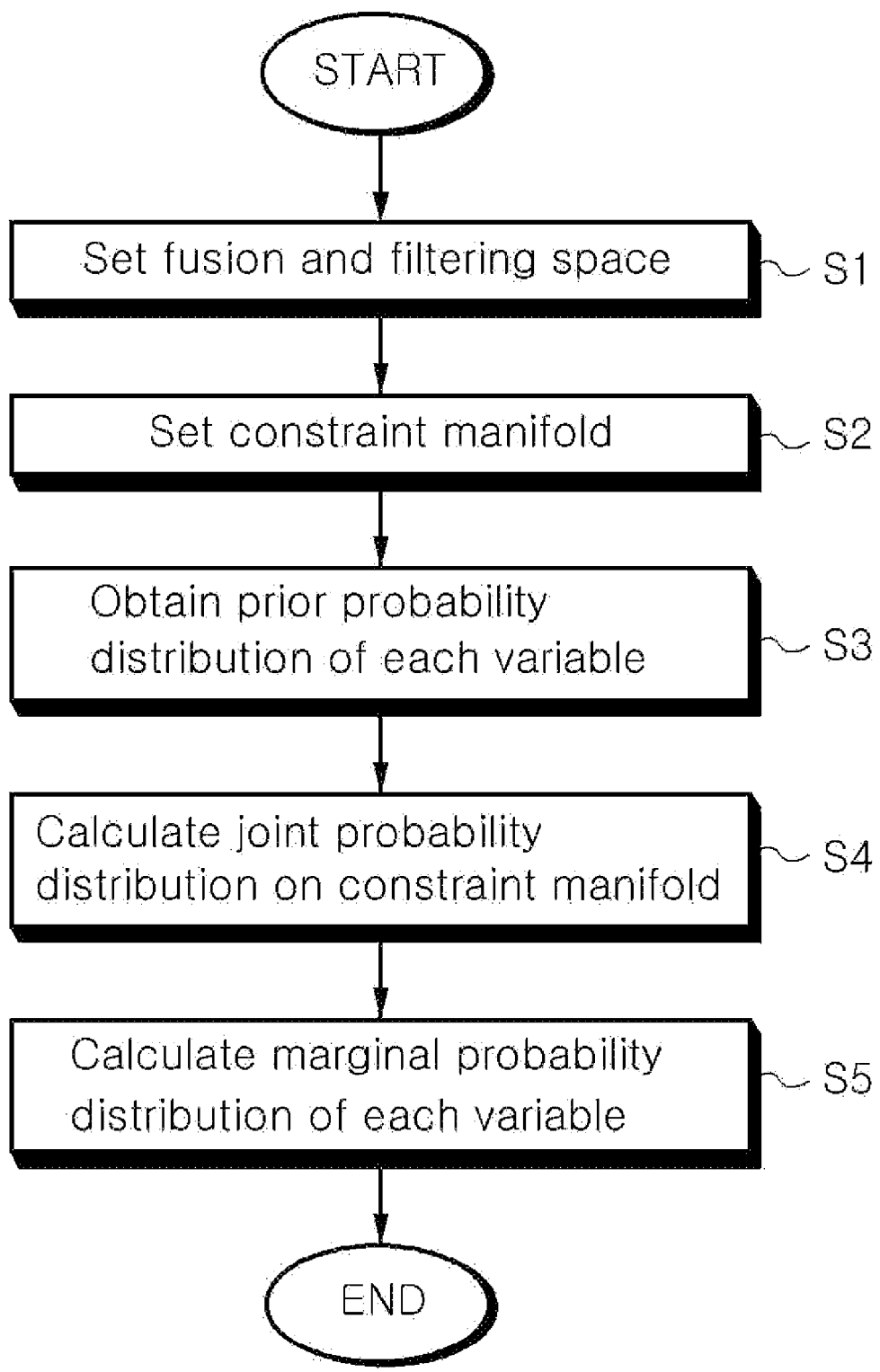
FIG. 2 is a flowchart illustrating a sensor fusion and filtering method based on a constraint manifold in accordance with the present invention.

As illustrated in FIG. 2, a sensor fusion and filtering method based on a constraint manifold in accordance with the present invention includes a step S1 of setting a sensor fusion and filtering space composed of each variable, a step S2 of setting the constraint manifold in the sensor fusion and filtering space, a step S3 of finding a prior probability distribution of the variables, a step S4 of calculating a joint probability distribution on the constraint manifold from the prior probability distribution, and a step S5 of performing back propagation from the joint probability distribution toward each variable axis and calculating a marginal probability distribution. These steps are executed by a plurality of sensors and a processor for processing data collected from the plurality of sensors. For example, the plurality of sensors used in the present invention may be composed of, but not limited to, an ultraviolet sensor, an infrared sensor, a heat sensor, and so on. The processor for processing data collected from the plurality of sensors has a function capable of executing steps S1 to S5, which is accomplished by a typical computer system.

In order to explain the sensor fusion and filtering approach according to the present invention, assuming that the observations be $z_1$, $z_2$, and $z_3$ respectively, that estimates or of the observations be $v_1$, $v_2$, and $v_3$ respectively, and that correlation, constraint, between the respective estimates be $f(v_1, v_2, v_3)=0$, it can be considered that the marginal probability distribution of the variables is obtained as in Equation 1 as follows.

$$p\begin{pmatrix} v_i \mid \\ z_1, z_2, z_3, \\ f(v_1, v_2, v_3) = 0 \end{pmatrix} = \int\int \left[ p\begin{pmatrix} v_1, v_2, v_3 \mid \\ z_1, z_2, z_3, \\ f(v_1, v_2, v_3) = 0 \end{pmatrix} \right] dv_j dv_k \quad \text{[Eqaution 1]}$$

$$= \int_{f(v_1, v_2, v_3) = 0} \left[ p\begin{pmatrix} v_1, v_2, v_3 \mid \\ z_1, z_2, z_3, \end{pmatrix} \right] dv_j dv_k$$

where i=1, 2 and 3, j=mod(i+1), and k=mod(i+2).

This process of the present invention can be compared with estimate of Bayesian concept used in general sensor fusion and filtering, as follows.

Estimates of $v_1$, $v_2$, and $v_3$ of the Bayesian concept can be obtained by finding a posterior probability distribution of Equation 2 below.

$$p(v_i; z_1, z_2, z_3, f(v_1, v_2, v_3)=0) \quad \text{[Equation 2]}$$

where i=1, 2 and 3.

Accordingly, it can be seen in the present invention that the process of finding the marginal probability distribution of each variable $v_1$ is equal to the process of finding the posterior probability distribution of Equation 2 above.

A process of finding the marginal probability distribution of Equation 1 in the present invention is as follows.

First, a sensor fusion and filtering space consisting of $v_1$, $v_2$, and $v_3$ is defined as $(v_1, -v_2, -v_3)$, and a constrict is set as $f(v_1, v_2, v_3)=0$.

At this time, the observations $z_1$, $z_2$ and $z_3$ and variances are given by a prior probability of each of $v_1$, $v_2$, and $v_3$ axes, and a joint probability distribution $p(v_1, -v_2, -v_3|z_1, z_2, z_3)$ is expressed in the sensor fusion and filtering space $(v_1, -v_2, -v_3)$ by a product of each prior probability value.

The constraint, $f(v_1, v_2, v_3)=0$, is given, thus being geometrically denoted in this space, and a joint probability distribution on the constraint, $p(v_1, -v_2, -v_3|z_1, z_2, z_3, f(v_1, v_2, v_3)=0)$, is found.

The estimate of each variable and an updated variance is obtained by finding the marginal probability distribution that performs back propagation on the joint probability distribution on the constraint toward each axis. Thus, the sensor fusion and filtering method may be treated equal to the process of finding the marginal probability distribution as in Equation 1.

Figure 3:
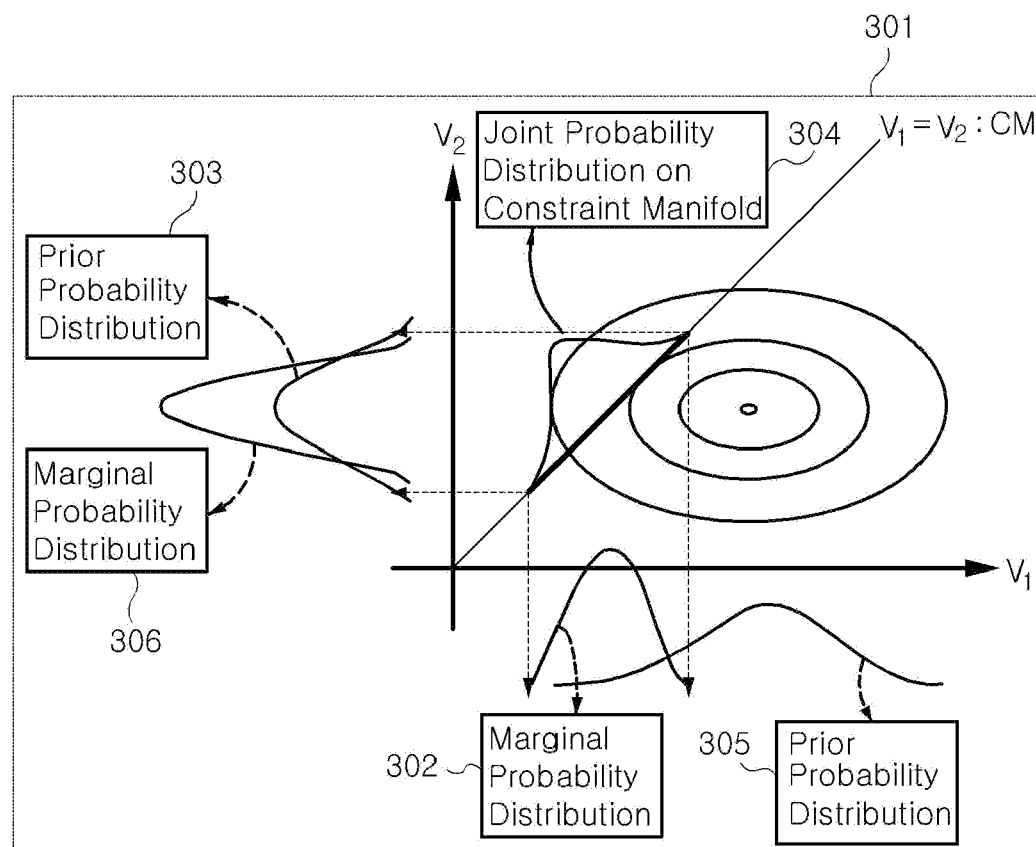
FIG. 3 illustrates a concept of sensor fusion based on a linear constraint manifold in accordance with an embodiment of the present invention.

FIG. 3 illustrates a concept of sensor fusion based on a linear constraint manifold in accordance with an embodiment of the present invention. The sensor fusion and filtering method according to the present invention will be described below with reference to FIG. 3.

In general when two observations $z_1$ and $z_2$ are given in the Bayesian concept, a formula for estimating a fused result, v, is given as the following Equation 3.

$$p(v \mid z_1, z_2) = \frac{p(z_2 \mid z_1, v) p(z_1 \mid v) p(v)}{p(z_1, z_2)} \quad \text{[Equation 3]}$$

Here, if the observations $z_1$ and $z_2$ are independent of each other, Equation 3 is simplified as in Equation 4 below $$P(v \mid z_1, z_2) = k_1 p(z_2 \mid v) P(z_1 \mid v) \quad \text{[Equation 4]}$$

$$= (z \mid v)$$

where $k_1$ is the normalization coefficient.

As in FIG. 3, in order to perform the sensor fusion and filtering according to the present invention, as in the following Equation 5, a constraint 301 is set as $v_1=v_2$ and a joint probability distribution 304 on the constraint is found using prior probability distributions 303 and 305 of the variables. Then marginal probability distributions of $v_1$ and $v_2$ are obtained by the back propagation.

$$P\begin{pmatrix} v_1 \mid \\ z_1, z_2, v_1 = v_2 \end{pmatrix} = \int \left[ p\begin{pmatrix} v_1, v_2 \mid \\ z_1, z_2, v_1 = v_2 \end{pmatrix} \right] dv_2 \quad \text{[Equation 5]}$$

$$\int_{v_1 = v_2} \left[ p\begin{pmatrix} v_1, v_2 \mid \\ z_1, z_2 \end{pmatrix} \right] dv_2$$

Here, due to $v_1=v_2$, when the integration is solved and rewritten, the following Equation 6 is obtained.

$$P(v_1 \mid z_1, z_2, v_1 = v_2) = P(v_2 \mid z_1, z_2, v_1 = v_2) \quad \text{[Equation 6]}$$

$$= P(v_1, v_2 \mid z_1, z_2, v_1 = v_2)$$

In the present invention, in order to demonstrate that the process of finding the marginal probability distribution is conceptually equal to the process of finding the posterior probability distribution in the general sensor fusion and filtering, rearrangement of Equation 6 above leads to Equation 7 below.

$$P\begin{pmatrix} v_1, v_2 \mid \\ z_1, z_2, v_1 = v_2 \end{pmatrix} = \frac{P\begin{pmatrix} z_1, z_2 \mid \\ v_1, v_2, v_1 = v_2 \end{pmatrix} p\begin{pmatrix} v_1, v_2, \\ v_1 = v_1 \end{pmatrix}}{p(z_1, z_2, v_1 = v_2)} \quad \text{[Equation 7]}$$

$$= k_2 p\begin{pmatrix} z_2 \mid \\ z_1, v_2, v_2 = v_1 \end{pmatrix} p\begin{pmatrix} z_1 \mid \\ v_1 \end{pmatrix}$$

where $k_2 = \dfrac{p\begin{pmatrix} v_1, v_2, \\ v_1 = v_2 \end{pmatrix}}{p\begin{pmatrix} z_1, z_2, \\ v_1 = v_2 \end{pmatrix}}$ the normalization coefficient If the observations $z_1$ and $z_2$ are independent of each other, Equation 7 is simplified as in Equation 8 below.

$$p\left(\begin{array}{c}v_1, v_2 \mid \\ z_1, z_2, v_1 = v_2\end{array}\right) = k_2 p\left(\begin{array}{c}z_1, z_2 \mid \\ v_1, v_2, v_1 = v_2\end{array}\right) \quad \text{[Equation 8]}$$

$$= k_2 p(z_2 \mid v_2, v_2 = v_1) p(z_1 \mid v_1)$$

In this manner, Equations 7 and 8 derived from the sensor fusion and filtering of the present invention are matched with Equations 3 and 4 derived from the general sensor fusion approach.

Letting the constraint manifold according to the present invention be regarded as an arbitrary non-linear function and extend through a more general sensor fusion and filtering method, a state estimate problem will be described as follows.

It is assumed that an actual value and estimate of the variable at times k−1 and k be $(v_{k-1}, x_{k-1})$ and $(v_k, x_k)$, and that a state transition function be $f(v_{k-1}, v_k)=0$.

Further, it is assumed that an output value of a sensor observing $u_k$ is $z_k$, while actual state and observation $u_k$ and $v_k$ meet $u_k=v_k$, and that uncertainties related to $x_{k-1}$ and $z_k$ be given as $p(x_{k-1}|v_{k-1})$ and $p(z_k|u_k)$.

At this time, the estimate $v_k$ according to the present invention is obtained in the following procedures.

The sensor fusion and filtering space is set to $(v_{k-1}, -u_k)$, and the constraint manifold is $f(v_{k-1}, u_k)=0$. The estimate $v_k$ is given as $p(v_k|x_{k-}, z_k, f(v_{k-1}, u_k)=0$, and is calculated by the following Equation 9.

$$\int_{f(V_{k-1}, U_k)=0} [p(V_{k-1}, u_k|x_{k-1}, z_k)] dv_{k-1}$$

or $$\int [p(v_{k-1}, u_k|x_{k-}, z_k, f(v_{k-1}, u_k)=0] dv_{k-1} \quad \text{[Equation 9]}$$

Here, a joint probability $p(v_{k-}, u_k|x_{k-}, z_k)$, is obtained from $p(x_{k-}, v_{k-})$ and $p(z_k|u_k)$.which has been already known.

In this manner, a fusion problem of the estimate $v_k$, which is obtained from propagation of $x_{k-}$ by the sensor observation value $z_k$ and the constraint manifold $f(v_{k-}, u_k)=0$, can be solved using the problem of meeting the constraint, as in Equation 9 above.

Figure 4:
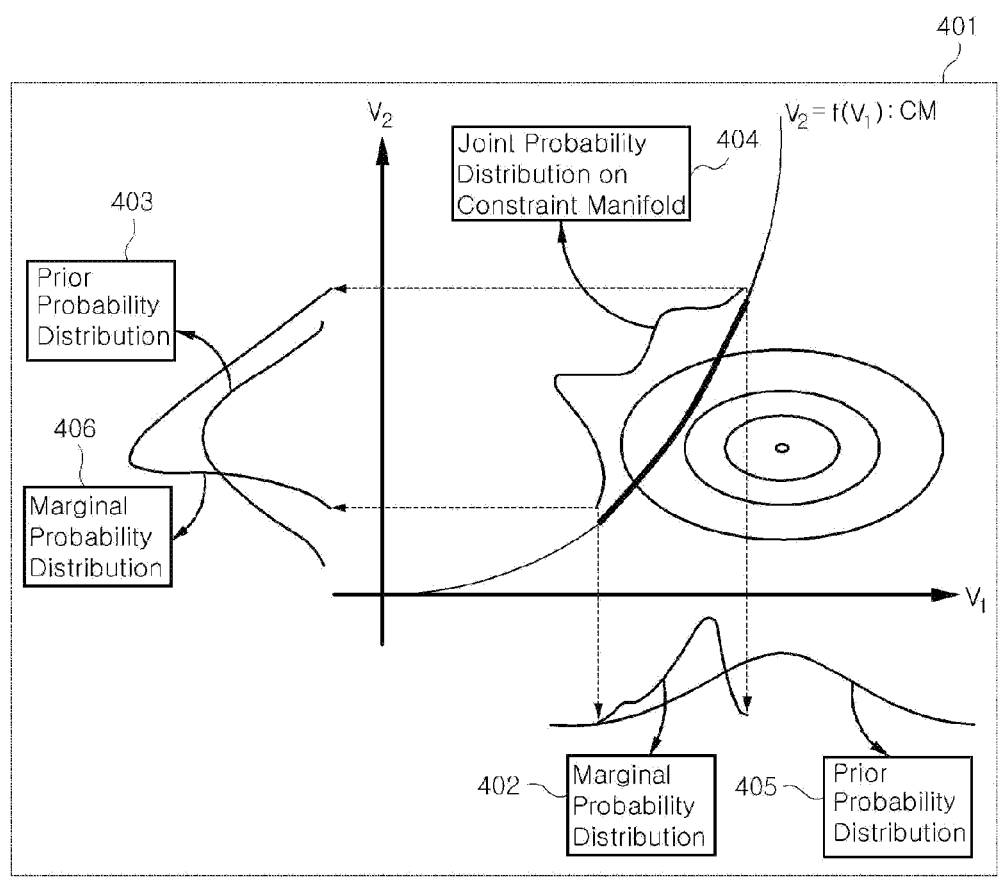
FIG. 4 illustrates a concept of sensor fusion based on a non-linear constraint manifold in accordance with an embodiment of the present invention.

FIG. 4 illustrates a concept of sensor fusion in non-linear constraint manifold 401 according to an embodiment of the present invention. Referring to FIG. 4, a joint probability distribution 404 on a non-linear constraint and marginal probability distributions 402 and 406 can be represented in a fusion and filtering space consisting of two variables using prior probability distributions 403 and 406.

In this case, although the prior probability distributions 403 and 406 comply with a Gaussian distribution, the marginal probability distributions 402 and 405 obtained by back propagation from the joint probability distributions 404 on the constraint 401 has a non-Gaussian distributions.

Therefore, the present invention makes use of a sum of Gaussian in order to express a non-Gaussian probability model.

According to the present invention when mismatched information is fused, the joint probability distribution on the constraint manifold itself becomes flat, so that it is possible to detect a mismatch. Further, ambiguous information is expressed and calculated as a probability having several peaks by the sum of Gaussian, so that it can be processed without a single Gaussian approximation error.

Now, embodiments of the present invention will be described below.

In order to compare sensor fusion and filtering performance of the present invention with that of the conventional art, there is introduced an UNGM (Univariate Nonstationary Growth Model) having a system model of the following Equation 10 and an observation model of the following Equation 11. A uniform sampling is made on a constraint manifold, thereby reflecting geometrical non-linearity of a constraint on the filtering. Samples corresponding to samples on the manifold in a geometrical space of the constraint exist on each axis establishing the space, and it can be seen that these samples are disposed according to the non-linearity as a geometrical characteristic. A state estimation simulation is performed, which compares a sensor fusion and filtering method of the present invention with conventional extended Kalman filter, unscented Kalman filter, and particle filter.

The following test method is based on the sampling method according to the present invention.

Figure 5:
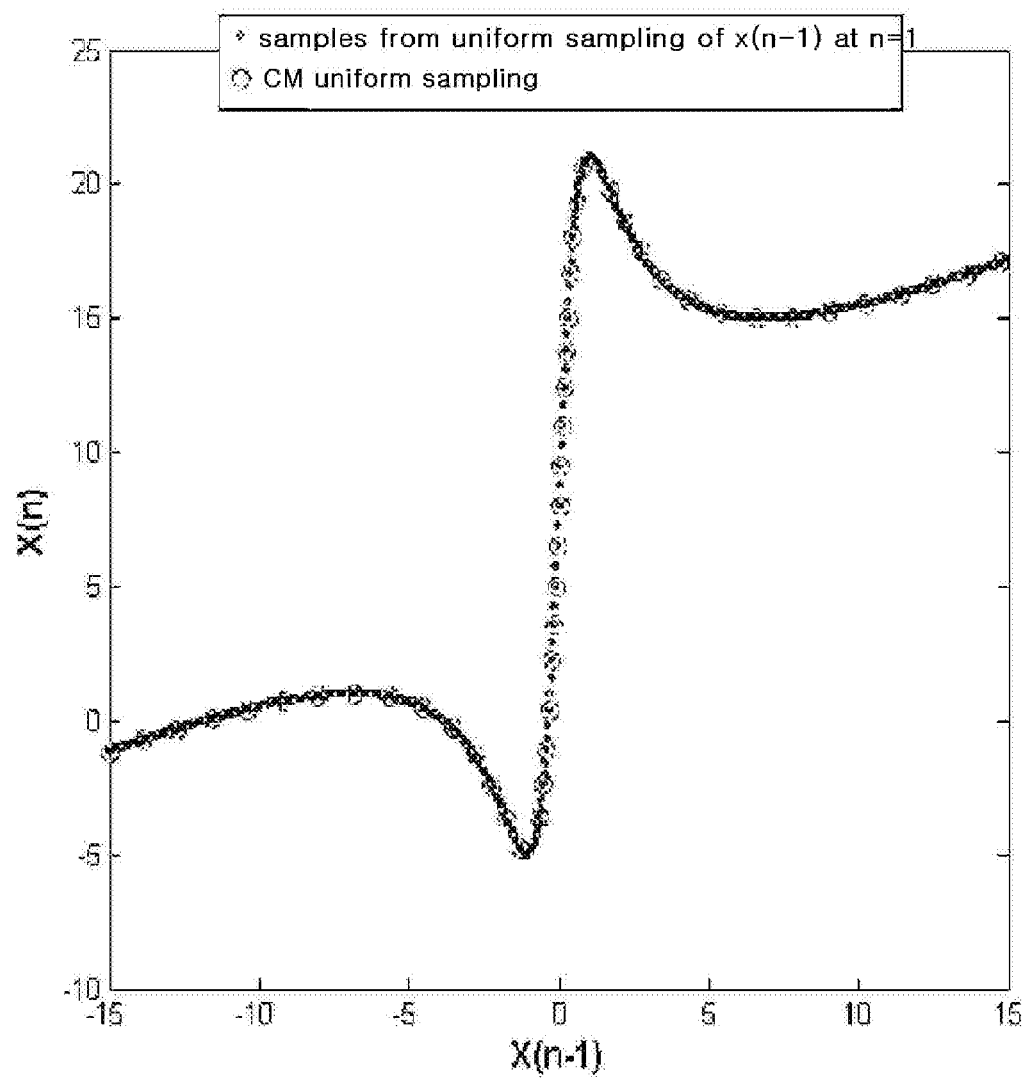
FIG. 5 illustrates results of implementing uniform sampling on a geometrical manifold constituting a system model of Equation 10 of the present invention.

1. Sampling is performed on a manifold in the geometrical space of a given system model equation at regular intervals. This sampling is called "Uniform Sampling on Constraint Manifold," which is shown in FIG. 5.

2. Samples $x_{n-1}$ corresponding to the "Uniform Sampling on Constraint Manifold" are not uniformly disposed. The samples are uniformly divided on $x_{n-1}$ axis at an interval wider than that of the "Uniform Sampling on Constraint Manifold," wherein each interval is called "bucket," The number of samples existing in each bucket is counted and denoted by m. Original weights are varied according to m, each of which is referred to as "modified weight." The modified weight is obtained as follows.

Modified Weight=Original Weight/$m$

Figure 6:
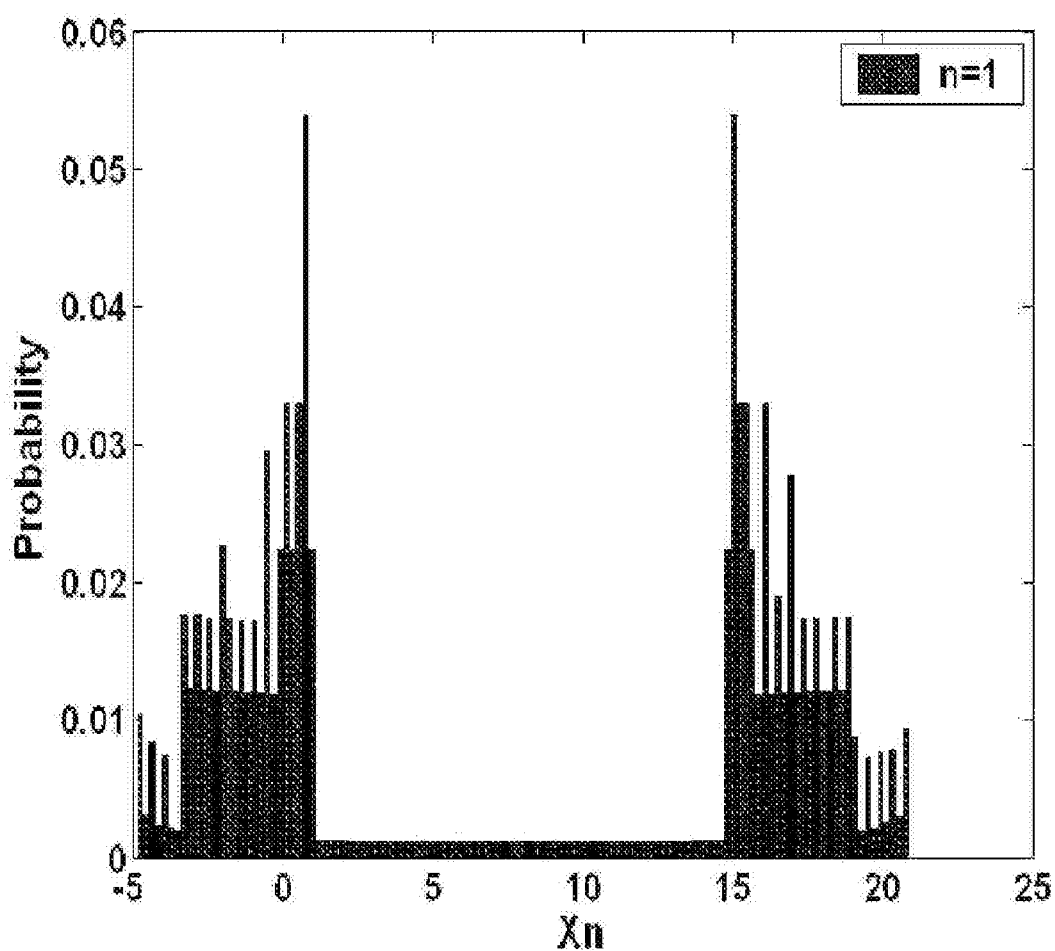
FIG. 6 illustrates a sample distribution of $x_n$ when $x_{n-1}$ of Equation 10 of the present invention is composed of Gaussian samples.
Figure 7:
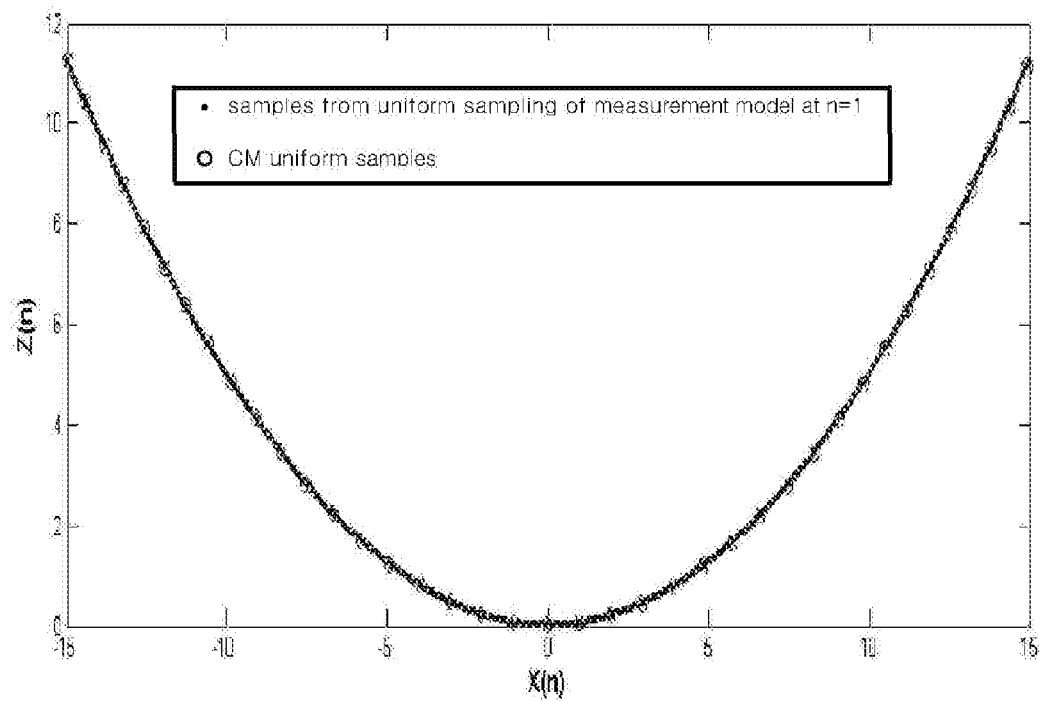
FIG. 7 illustrates results of implementing uniform sampling on a geometrical manifold constituting an observation model of Equation 10 of the present invention.

3. A probability distribution of $x_n$ corresponding to $x_{n-1}$ is represented through the modified weight obtained from the above step 2. Results of the probability distribution of $x_n$ (when n=1) are shown as in FIG. 6. As illustrated in FIG. 6, it can be seen that the probability distribution is shown by the non-linearity of the system model equation.

4. The probability distribution of $x_n$ is found through the above steps 1 to 3 in the given observation model equation.

5. The probability distribution $p(x_n)$ of the above step 3 is multiplied by the probability distribution $p(x_n)$ of the above step 4, and then primary moments of each sample value and weight corresponding to each sample are obtained. Thereby, a final value is obtained.

$$x_n = \alpha x_{n-1} + \beta \frac{x_{n-1}}{1 + x_{n-1}^2} + \gamma \cos(1.2(n-1)) + u_n \quad \text{[Equation 10]}$$

where, $u_n$=N(0, $\sigma_u^2$), the system noise, and $x_0$=0.1, $\alpha$=0.5, $\beta$=25, $\gamma$=8, and N=100 are set.

$$y_n = \frac{x_n^2}{20} + v_n \ (n = 1, \cdots, N) \quad \text{[Equation 11]}$$

where $v_n$=N(0, $\sigma_v^2$), the observation noise.

The UNGM is a dynamic state space model having highly non-linear and bimodal characteristics, and shows poor estimation performance when there is inaccurate state estimation using the conventional extended Kalman filter or unscented Kalman filter, or when there is an excessive observation or non-Gaussian error using the particle filter complying with general SIS (Sequential Importance Sampling).

Further, the present invention obtains samples, which meet the non-linearity of the constraint manifold as well as the constraint manifold by a Monte Carlo method.

Embodiment 1 and Comparative Example 1

Figure 8:
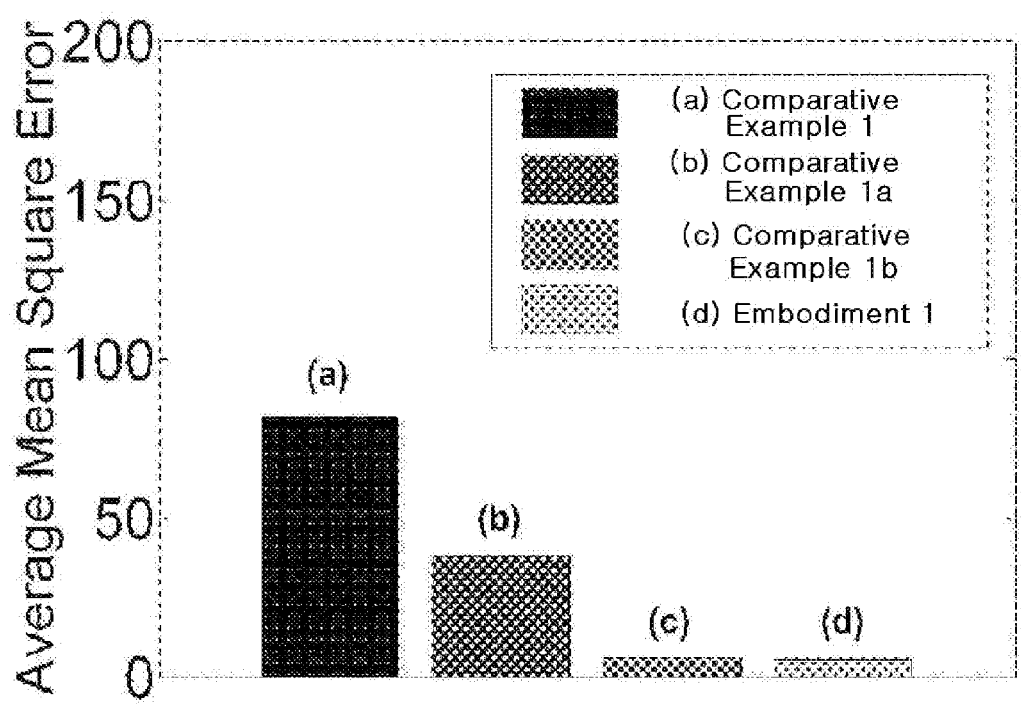
FIG. 8 is a graph illustrating average mean square errors according to embodiment 1 of the present invention and comparative example 1.

FIG. 8 illustrates average mean square error comparison of constraint manifold-based sensor fusion and filtering mode (embodiment 1), extended Kalman filtering mode (comparative example 1), unscented Kalman filtering mode (comparative example 1a), particle filtering mode (comparative example 1b), when simulation is performed 50 times under conditions of $u_n=N(0, \sigma_u^2=1)$, $v_n=N(0, \sigma_v^2=1)$, and N=100. It can be seen from the results of FIG. 8 that the sensor fusion and filtering mode according to the present invention exhibited robustness to the bimodal system.

Embodiment 2 and Comparative Example 2

Figure 9:
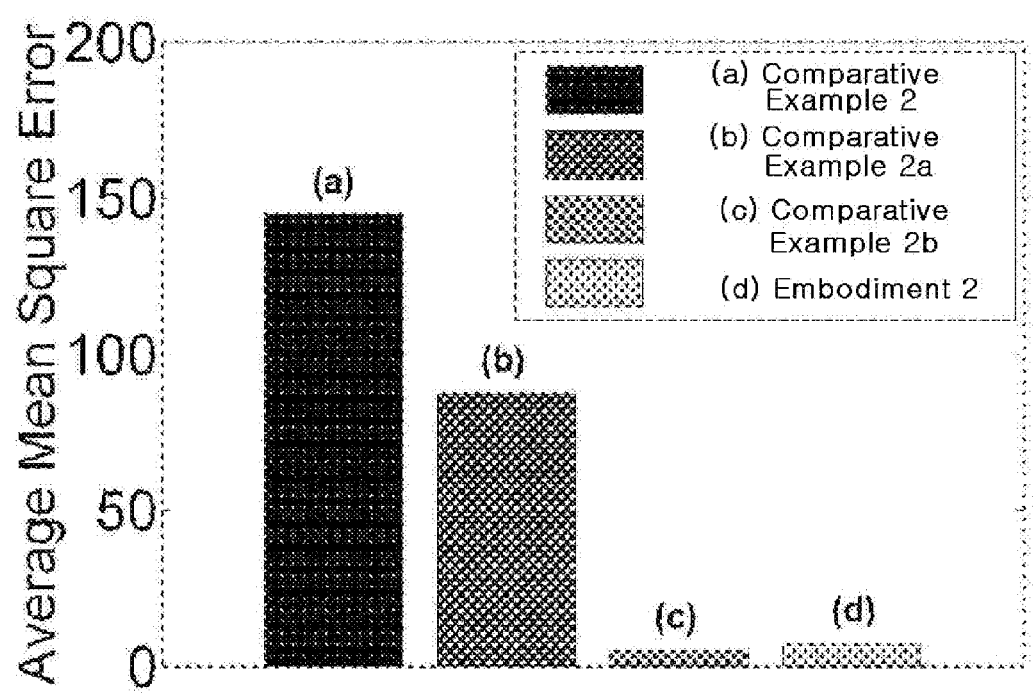
FIG. 9 is a graph illustrating average mean square errors according to embodiment 2 of the present invention and comparative example 2.

FIG. 9 illustrates average mean square error comparison of constraint manifold-based sensor fusion and filtering mode (embodiment 2), extended Kalman filtering mode (comparative example 2), unscented Kalman filtering mode (comparative example 2a), particle filtering mode (comparative example 2b), when simulation is performed 50 times under conditions of $u_n=0.5*N(0, \sigma_u^2=0.5)+0.5*N(0, \sigma_u^2=1.5)$, $v_n=N(0, \sigma_v^2=1)$, and N=100. It can be seen from the results of FIG. 9 that the sensor fusion and filtering mode according to the present invention exhibited robustness to the non-Gaussian noise.

Embodiment 3 and Comparative Example 3

Figure 10:
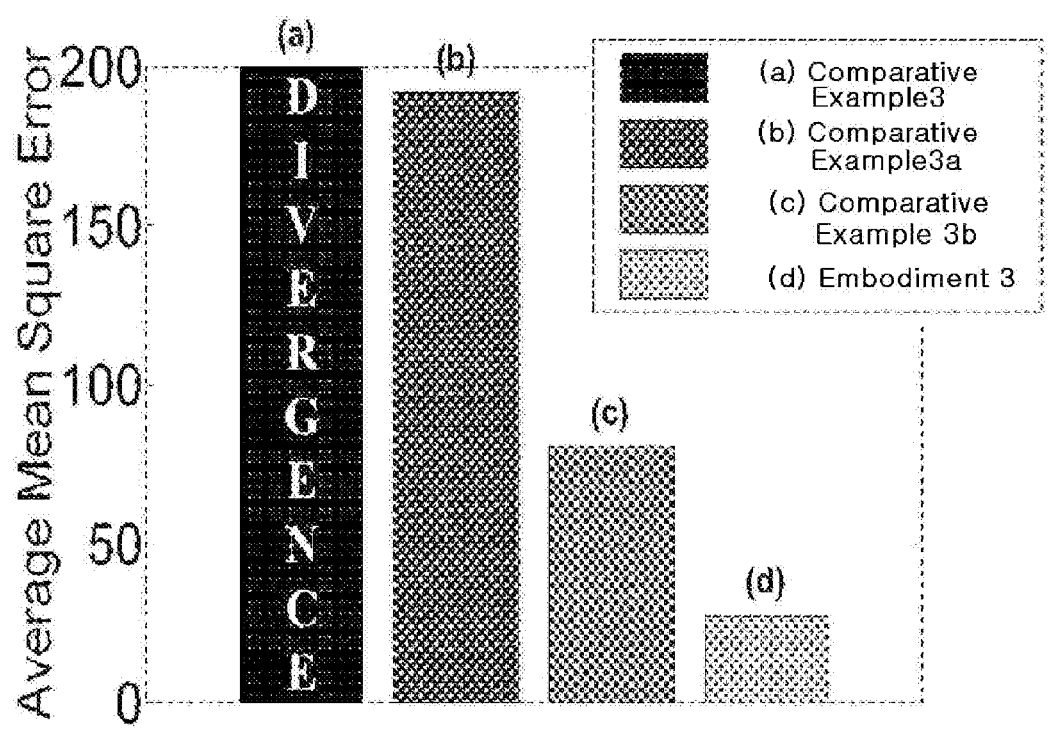
FIG. 10 is a graph illustrating average mean square errors according to embodiment 3 of the present invention and comparative example 3.

FIG. 10 illustrates average mean square error comparison of constraint manifold-based sensor fusion and filtering mode (embodiment 3) when simulation is performed 50 times under conditions of a wrong error model of $u_n=N(0, \sigma_u^2=10)$, $v_n=N(0, \sigma_v^2=1)$, and N=100, and extended Kalman filtering mode (comparative example 3), unscented Kalman filtering mode (comparative example 3a), particle filtering mode (comparative example 3b), when simulation is performed 50 times under conditions of $u_n=N(0, \sigma_u^2=1)$, $v_n=N(0, \sigma_v^2=1)$, and N=100. It can be seen from the results of FIG. 10 that the sensor fusion and filtering mode according to the present invention exhibited robustness to the wrong error model.

Embodiment 4 and Comparative Example 4

Figure 11:
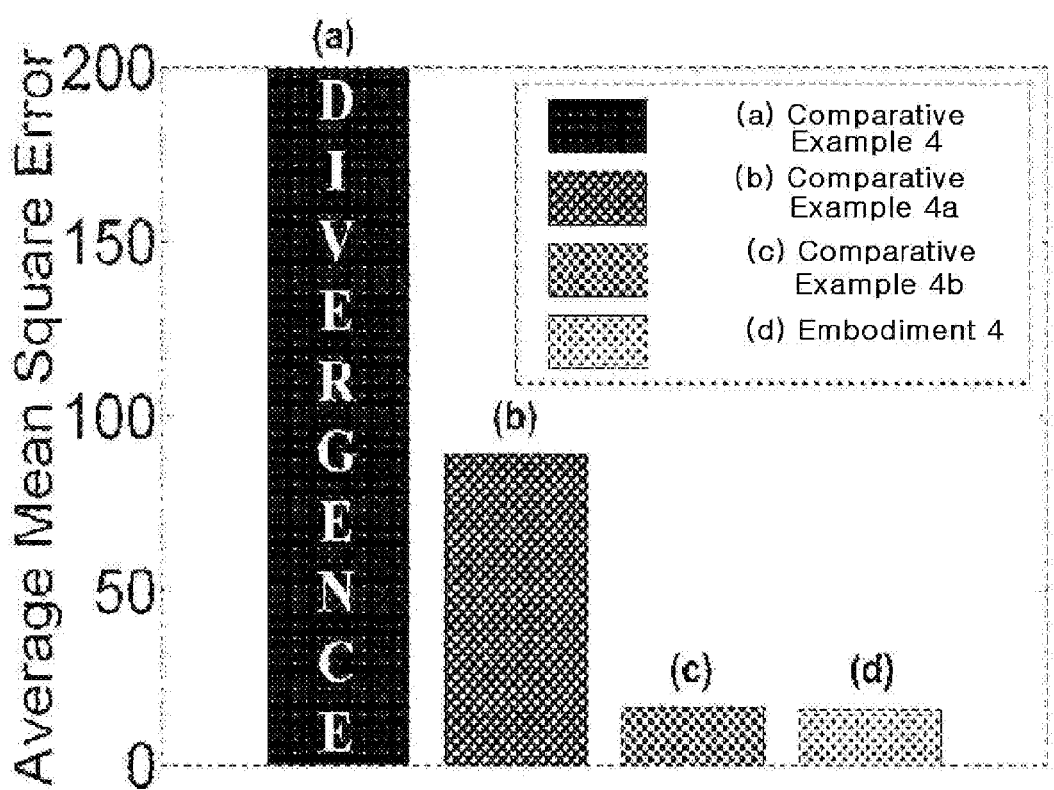
FIG. 11 is a graph illustrating average mean square errors according to embodiment 4 of the present invention and comparative example 4.

FIG. 11 illustrates average mean square error comparison of constraint manifold-based sensor fusion and filtering mode (embodiment 4), extended Kalman filtering mode (comparative example 4), unscented Kalman filtering mode (comparative example 4a), particle filtering mode (comparative example 4b), when simulation is performed 50 times under conditions of $u_n=N(0, \sigma_u^2=100)$, $v_n=N(0, \sigma_v^2=1)$, and N=100. It can be seen from the results of FIG. 11 that the sensor fusion and filtering mode according to the present invention exhibited excellent robustness to system noise.

Embodiment 5 and Comparative Example 5

Figure 12:
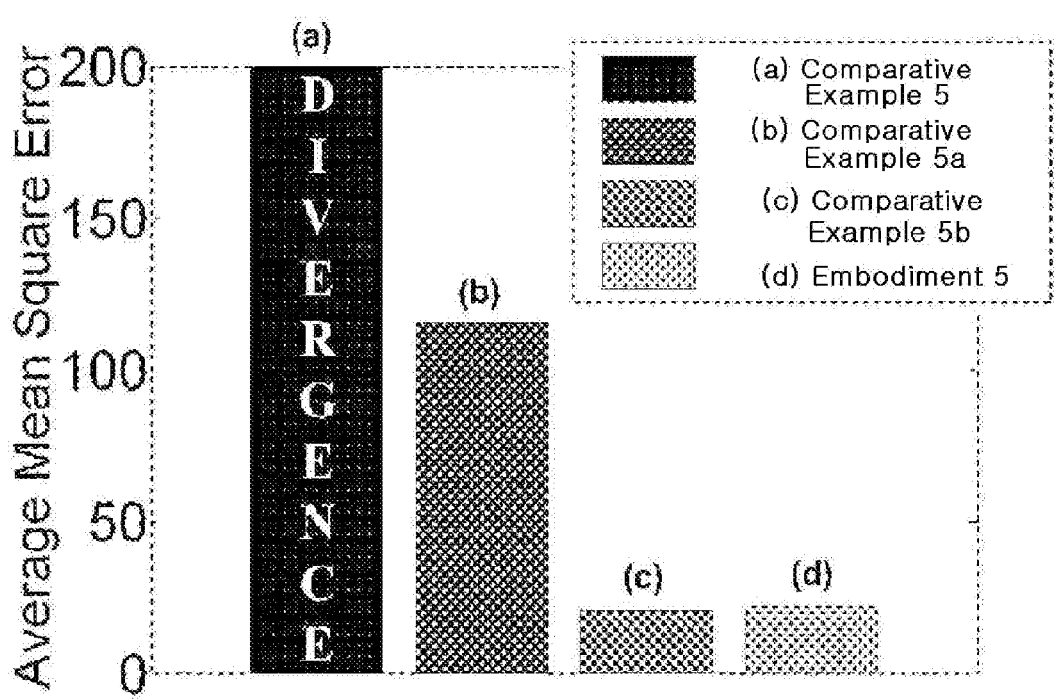
FIG. 12 is a graph illustrating average mean square errors according to embodiment 5 of the present invention and comparative example 5.

FIG. 12 illustrates average mean square error comparison of constraint manifold-based sensor fusion and filtering mode (embodiment 5), extended Kalman filtering mode (comparative example 5), unscented Kalman filtering mode (comparative example 5a), particle filtering mode (comparative example 5b), when simulation is performed 50 times under conditions of $u_n=N(0, \sigma_u^2=100)$, $v_n=N(0, \sigma_v^2=1)$, and N=100, but with ambiguous information of $p(y_n)=0.5N(m_y, v_n)+0.5N(m_y+\epsilon, v_n)$, $\epsilon=0$~$30$ every ten times. It can be seen from the results of FIG. 12 that the sensor fusion and filtering mode according to the present invention exhibited robustness to the ambiguous information.

Embodiment 6 and Comparative Example 6

Figure 13:
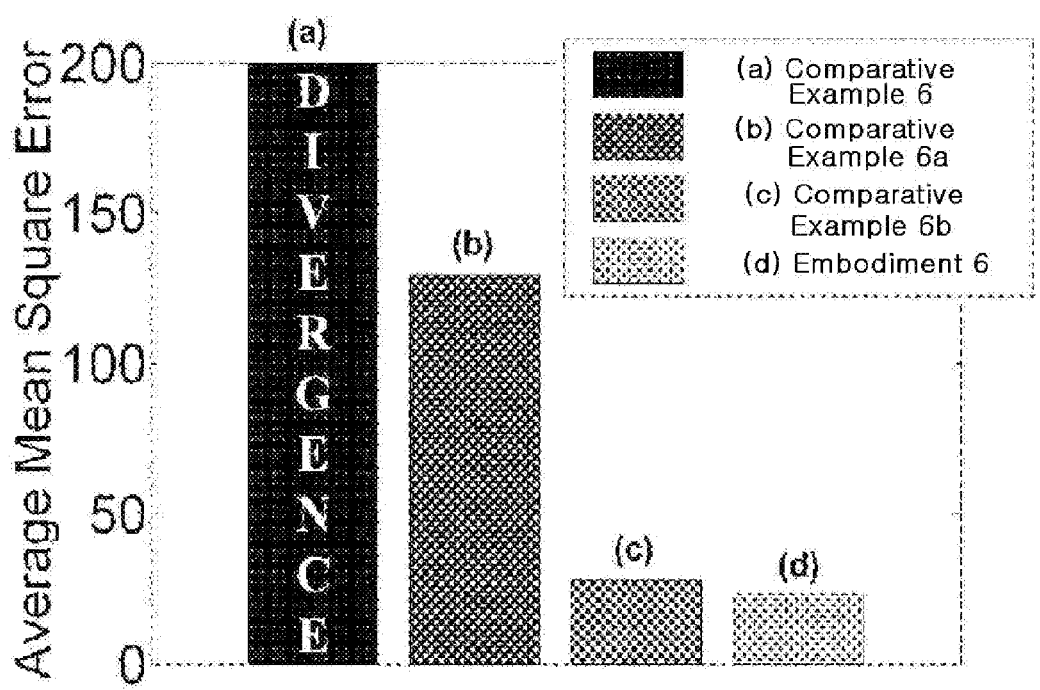
FIG. 13 is a graph illustrating average mean square errors according to embodiment 6 of the present invention and comparative example 6.

FIG. 13 illustrates average mean square error comparison of constraint manifold-based sensor fusion and filtering mode (embodiment 6), extended Kalman filtering mode (comparative example 6), unscented Kalman filtering mode (comparative example 6a), particle filtering mode (comparative example 6b), when simulation is performed 50 times under conditions of $u_n=N(0, \sigma_u^2=100)$, $v_n=N(0, \sigma_v^2=1)$, and N=100, but with mismatched information of $p(y_n)=N(m_y+\epsilon, v_n)$, $\epsilon=30$ every ten times. It can be seen from the results of FIG. 13 that the sensor fusion and filtering mode according to the present invention exhibited robustness to the mismatched information.

Embodiment 7 and Comparative Example 7

Figure 14:
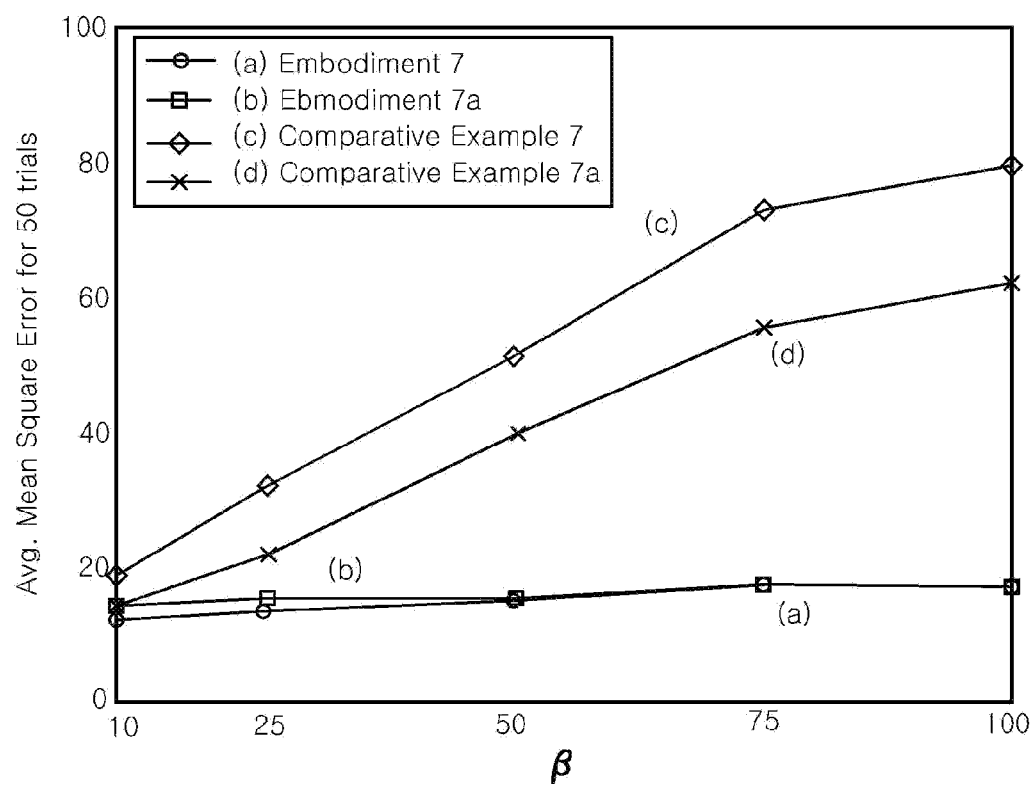
FIG. 14 is a graph illustrating average mean square errors according to embodiment 7 of the present invention and comparative example 7.
Figure 15:
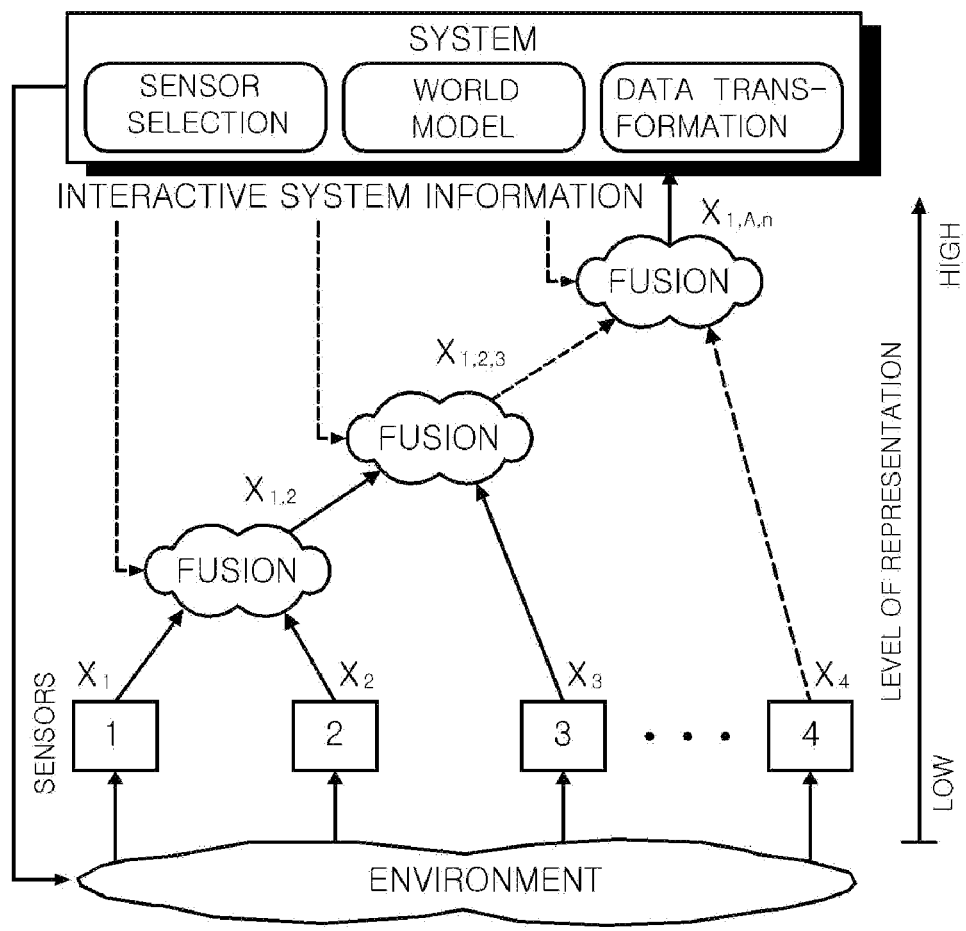
FIG. 15 illustrates a pattern of general sensor fusion.

FIG. 14 illustrates average mean square error comparison of constraint manifold-based sensor fusion and filtering modes (a) and (b) (embodiments 7 and 7a), and particle filtering modes (c) and (d) using 63 and 200 samples (comparative examples 7 and 7a), when simulation is performed 50 times on condition that an error model assumed for the filtering is $u_n=N(0, \sigma_u^2=10)$, $u_n=N(0, \sigma_u^2=1)$, $v_n=N(0, \sigma_v^2=100)$, and N=100, but that an actual system error model is $u_n=N(0, \sigma_u^2=,\beta)$, and N=100. It can be seen from the results of FIG. 14 that the sensor fusion and filtering modes according to the present invention exhibited robustness to the wrong error model compared to the particle filtering modes.

It can be found from the above results that the sensor fusion and filtering method according to the present invention has the least average mean square error with respect to each evaluation condition, so that it is possible to realize the robust sensor fusion and filtering mode with respect to each evaluation condition.

As set forth above, according to the constraint manifold-based sensor fusion and filtering method and system of the present invention, a technique of finding the joint probability on the constraint manifold defined in the unified fusion and filtering space is applied. Thereby, application of various constraints is possible, and the geometrically expressed constraint is directly treated, so that it can be applied to various models. The system model and observation model are expressed in the fusion and filtering space without linearization using the constraint manifold as they are. Thereby, it is possible to reduce decrease of the fusion and filtering performance caused by wrong linearization, and decrease a Gaussian approximation error. Further, it is possible to detect mismatched information and to be applied to a fusion and filtering problem of the system having ambiguous information.

The present invention have been described in detail with reference to, but not limited to, exemplary embodiments thereof Those skilled in the art will appreciate that a variety of modifications can be made to the described embodiments without departing from the spirit and scope of the present invention as defined by the appended claims and their equivalents.

What is claimed is:

1. A particle sampling method for sampling particles in order to filter ambiguous data or information on at least one state variable of a system using the particles, characterized in that sampling is carried out in consideration of the influence of the non-linearity of system dynamic model, observation model and/or other system constraints, on the probability distribution of state variables, and the particle sampling method comprises the steps of:

when the sampling performed on a constraint manifold in a hyper space of an arbitrary model equation at regular intervals, where a constraint manifold represents a system dynamic model and/or other system constraints defined in the hyper space of current and previous state variables, wherein the hyper space of an arbitrary model equation at regular intervals is defined as "Uniform Sampling on Constraint Manifold," previously performing the sampling in the hyper space from numerous sample meeting an equation for the system model at regular intervals, and obtaining particles of a previous state variable and a current state variable;

when an interval divided uniformly on an axis of the previous state variable is defined as a bucket, finding a weight of each particle of the current state variable estimated through a weight allocated by the particles of the previous state variable and prior probability information of the previous state variable and through a number of the particles existing in the bucket;

finding a prior probability distribution of a current state estimated from the estimated weight of the sampled particles of the current state variable and from the estimated weight of each particle of the current state variable; and previously performing the sampling in the geometrical space from the numerous samples meeting an equation for the observation model at regular intervals, and obtaining the particles of the previous state variable and particles of an observation variable.

2. The particle sampling method according to claim 1, characterized by the step of obtaining the samples which meet the non-linearity of the constraint manifold of the system model, the observation model and/or the other system constraints by a Monte Carlo method.

3. The particle sampling method according to claim 1, characterized in that, when the number of the samples existing in each bucket is denoted by m, the weight of the particles of the current state variable is found by:

Weight of particles of the current state variable=Weight of samples existing in each bucket/m.

4. A fusion and filtering method for fusing and filtering ambiguous data or information on at least one state variable of a system using particles, characterized by the steps of:

setting a data or information fusing and filtering space composed of state and observation variables;

defining a constraint manifold having various constraints in the fusing and filtering space;

calculating a joint probability distribution on the constraint manifold using a prior probability distribution of the variables;

calculating a marginal probability distribution of the variables from the joint probability distribution; and obtaining estimate and variance of each of the variables.

5. A particle sampling method for sampling particles in order to filter ambiguous data or information on at least one state variable of a system using the particles, characterized in that sampling is carried out in consideration of the influence of the non-linearity of system dynamic model, observation model and/or other system constraints, on the probability distribution of state variables, and the particle sampling method comprises the step of:

obtaining a weighted particle distribution of a current state variable by uniformly sampling the particles on an axis of a previous state variable in such a way as to find, from the previous state variable, the effect of a system dynamic model on the probability distribution of a current state variable with the weights, referred to here as prior probability weights, assigned to the uniformly sampled particles based on the prior probability distribution of the current state variable; and finding the final weights of the particles of a current state variable, where the particles are from the above uniform sampling with weights, by applying the probability distribution of the observation variable from measurement to the weighted particles of the current state variable in accordance with an equation for the observation model, such that the observed probability distribution and the prior probability weights are combined into the final weights.

6. A particle sampling method for sampling particles in order to filter ambiguous data or information on at least one state variable of a system using the particles, characterized in that sampling is carried out in consideration of the influence of the non-linearity of system dynamic model, observation model and/or other system constraints, on the probability distribution of state variables, and the particle sampling method comprises the steps of:

obtaining a particle distribution of a current state variable by aggregating, in a proper proportion, a particle distribution from uniformly sampling the particles on an axis of a previous state variable in such a way as to find, from the previous state variable, the effect of a system dynamic model on the probability distribution of a current state variable and a particle distribution of a current state variable from Monte Carlo sampling the particles on an axis of a previous state variable based on a prior probability distribution of the current state variable, wherein the prior probability distribution is estimated from an estimated weight of the sampled particles of the current state variable and from an estimated weight of each particle of the current state variable; and finding the weights of the particles of the current state variable, where the particles are from the above aggregation of two particle distributions, by applying the probability distribution of the observation variable from measurement to the particles of a current state variable in accordance with an equation for the observation model.

7. The particle sampling method according to claim 6, characterized by the step of obtaining the samples which meet the non-linearity of the constraint manifold of the system model, the observation model and/or the other system constraints by a Monte Carlo method.

* * * * *